United States Patent [19]
Lewis

[11] 3,752,409
[45] Aug. 14, 1973

[54] WOODEN ARTICLE AND LIKE DESTROYER
[75] Inventor: Herbert H. Lewis, Jacksonville, Fla.
[73] Assignee: Jacksonville Blow Pipe Company, Jacksonville, Fla.
[22] Filed: Sept. 30, 1971
[21] Appl. No.: 185,247

[52] U.S. Cl. .............................. 241/60, 241/101.7
[51] Int. Cl.... B02c 13/06, B02c 18/06, B02c 21/02
[58] Field of Search .................... 241/101.7, 101.5, 241/101 R, 60

[56] References Cited
UNITED STATES PATENTS
1,886,537   11/1932   Evans ........................ 241/101.7 X
3,473,742   10/1969   Montgomery ................ 241/60 X
2,972,848   2/1961    McKee ....................... 241/101.7 X
3,510,073   5/1970    Mailliard .................... 241/101.7 X
3,556,422   1/1971    Burkett ...................... 241/101.7

Primary Examiner—Donald G. Kelly
Attorney—William A. Straugh, James E. Nolan et al.

[57] ABSTRACT

Mobile apparatus for reducing discarded wooden railroad ties to relatively small fragments comprises a rail vehicle having a set of drive wheels, an engine connected to a two speed drive system for the wheels, a cutting and punching mechanism driven from the engine through a clutch, an interlock for disengaging the clutch when the vehicle is driven in the higher speed range, a conveyor for advancing ties to be reduced into the cutting mechanism, a crane for picking up ties to be reduced and depositing them on the conveyor, and a blower for discharging fragments from the cutting mechanism.

10 Claims, 9 Drawing Figures

INVENTOR
HERBERT H. LEWIS

Strauch Nolan Neale
Nies & Kurz
ATTORNEYS

Patented Aug. 14, 1973

INVENTOR
HERBERT H. LEWIS

Strauch Nolan Neale Nies + Kurz
ATTORNEYS

Patented Aug. 14, 1973

INVENTOR
HERBERT H. LEWIS

BY Strauch Nolan Neale Nies + Kurz
ATTORNEYS

INVENTOR
HERBERT H. LEWIS

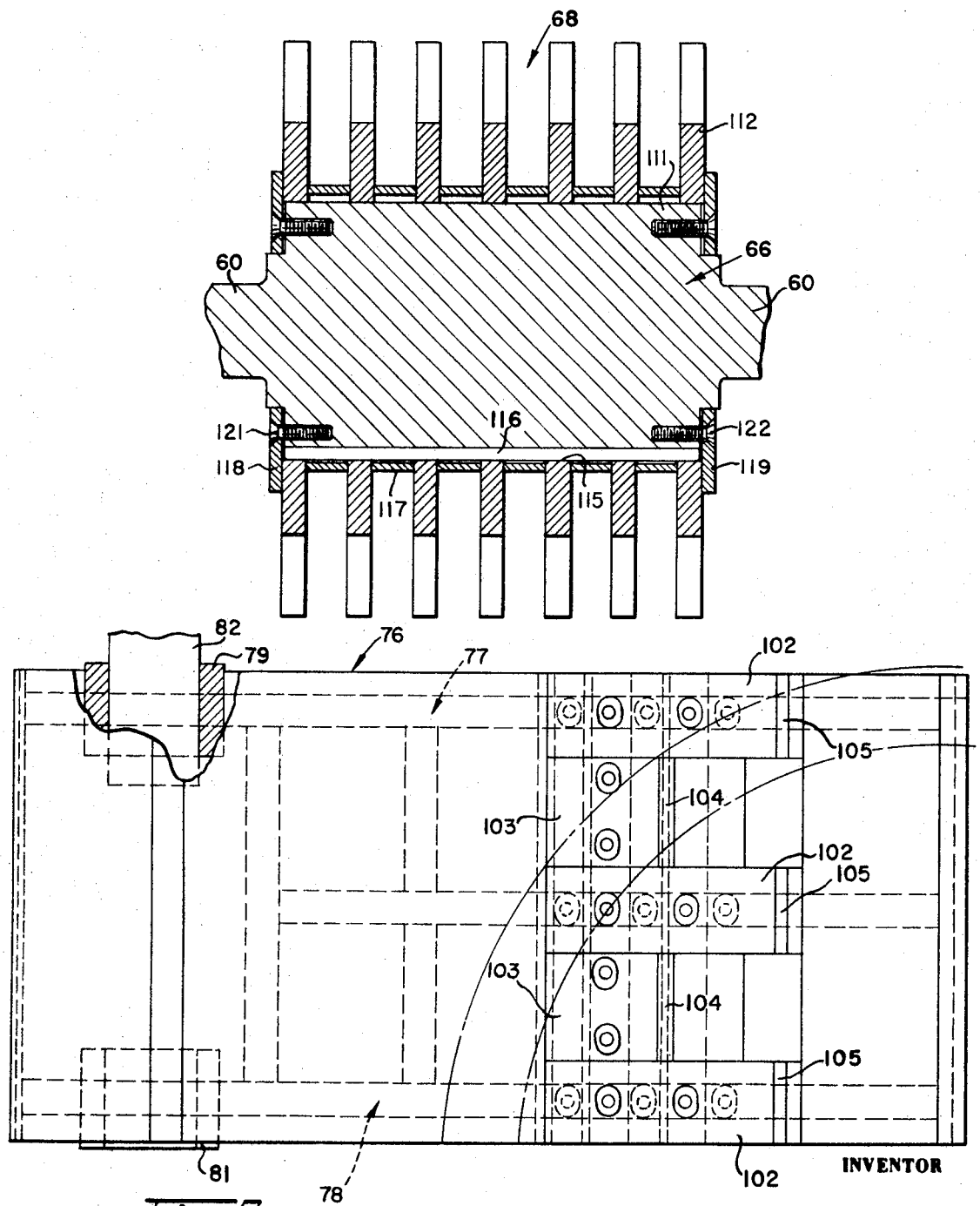

INVENTOR
HERBERT H. LEWIS

WOODEN ARTICLE AND LIKE DESTROYER

The invention in its preferred embodiment will be disclosed in a mobile machine adapted for the efficient and rapid destruction of worn out and discarded wooden railroad ties and corresponding articles. When a section of railroad track is rebuilt, deteriorated or damaged wooden ties are thrown to the side of the right of way and their disposal creates a problem.

Since these ties are usually impregnated with creosote for resisting decay, they cannot be burned in a fireplace or the like without objectionable odor. They cannot be burned alongisde the tracks, because of the objectionable smoke conditions. They have been offered free to the public, but no one seems to want them.

It has been decided that the preferred mode of disposing of these unwanted ties is to cut or shred them into small bits and fragments, and machines have been proposed for the purpose. These prior machines have been characterized however by inefficient loading techniques, inadequate cutting power and generally slow performance.

The present invention contemplates a machine that will pick up ties while moving along the tracks and feed them into a sturdy cutting and punching mechanism wherein the wood is reduced to fragments that are blown out and dispersed along the right of way, and this is a major object of the invention.

Another object of the invention is to provide novel mobile machine that picks up wooden blocks, ties or like articles to be destroyed, deposits them on a conveyor system that advances them into a powerful cutting and punching mechanism wherein the articles are reduced to fragments and then picks up the fragments in a powerful pressurized air disposal system that scatters them over an adjacent area.

Another object of the invention is to provide a cutting and punching mechanism embodying a novel anvil and associated shear pin structure.

A further object of the invention is to provide a novel feed roll arrangement and construction for an article destroying machine.

Further object will appear as the description proceeds in connection with the appended claims and the annexed drawings.

BRIEF DESCRIPTION OF DRAWINGS

FIG. 6 is a section showing the feed roll assembly;

FIG. 7 is a plan view showing the anvil;

PREFERRED EMBODIMENTS

Figure 1:
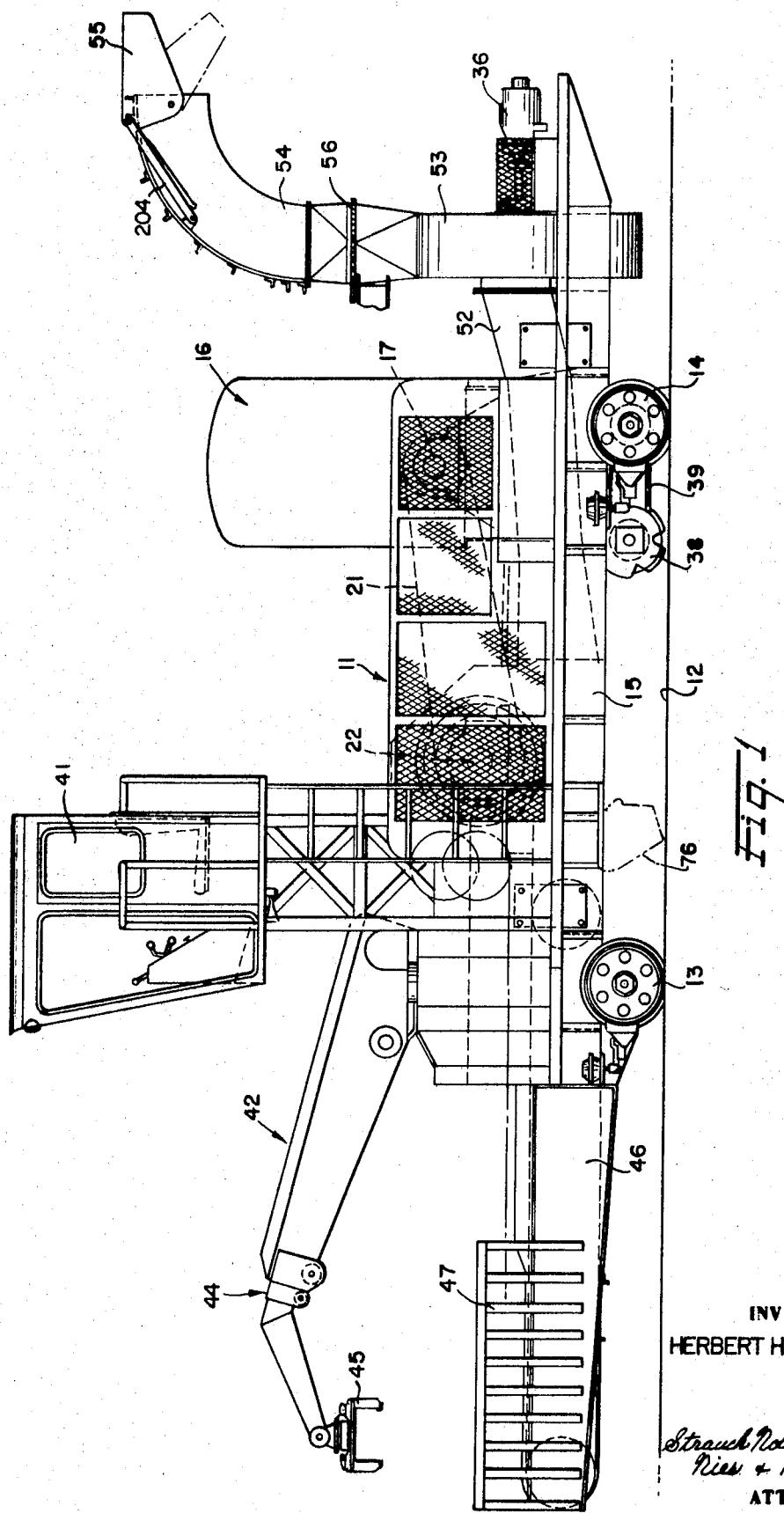
FIG. 1 is a side elevation showing a machine according to a preferred embodiment of the invention.

The machine 11 is shown in FIG. 1 as mounted on a railroad track 12 by means of front and rear wheel sets 13 and 14 respectively on trucks connected by suitable suspensions to a chassis 15.

Figure 2:
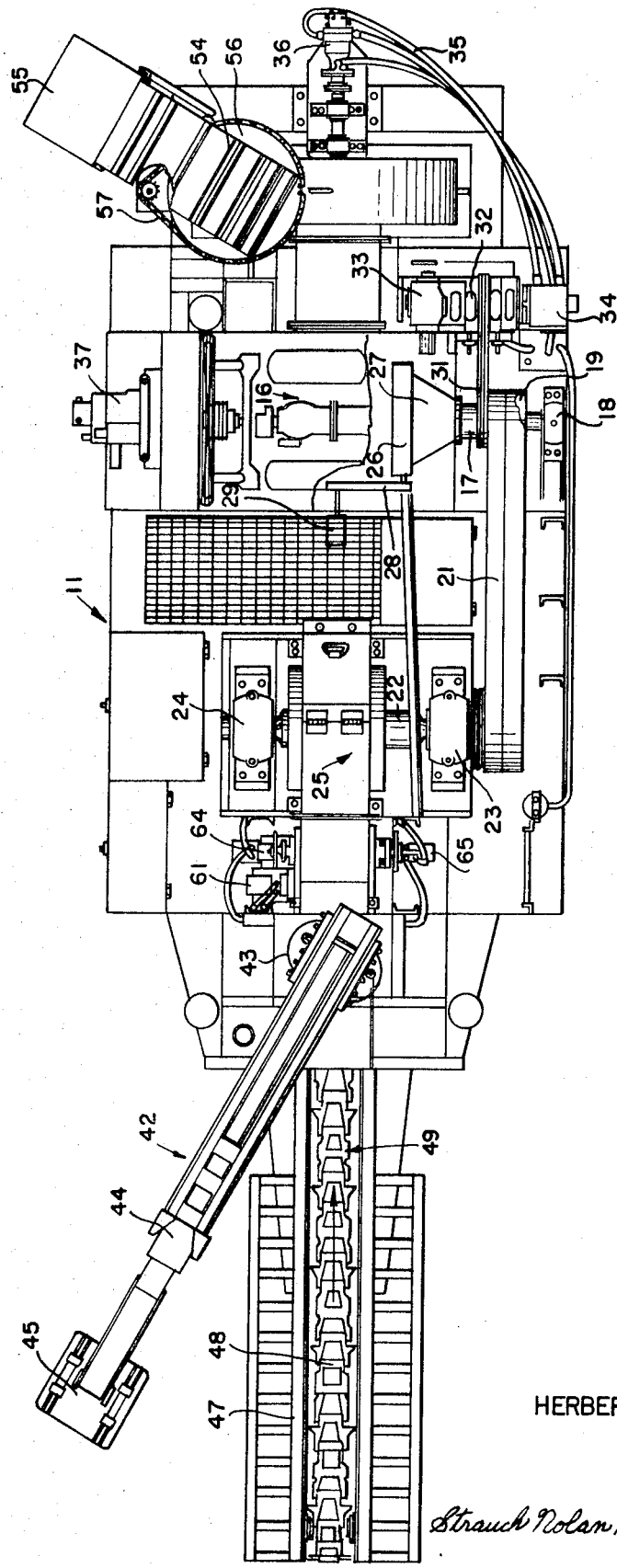
FIG. 2 is a top plan view of the machine of FIG. 1.

Mounted on the chassis is a prime mover in the form of a powerful engine assembly 16, preferably a Diesel motor unit. A transverse power output shaft 17 extends at one side to be supported at its outer end by outboard bearing 18 as shown in FIG. 2. A pulley 19 on shaft 17 is connected by drive belt 21 to a pulley (not shown) on a transverse shaft 22 journalled at opposite ends in bearings 23 and 24 on the chassis to rotate parallel to shaft 17. Mounted on shaft 22 is a cutting and punching mechanism 25 shown in more detail in FIG. 3 and 8 and later to be described.

In the drive line between the motor unit 16 and shaft 17 is a clutch 26 and a gear reduction unit 27. Th clutch is engaged or disengaged by a lever indicated at 28 in FIGS. 2 and 9. Lever 28 may be operated manually, or by a control cylinder 29 as will be explained in connection with FIG. 9.

Figure 9:
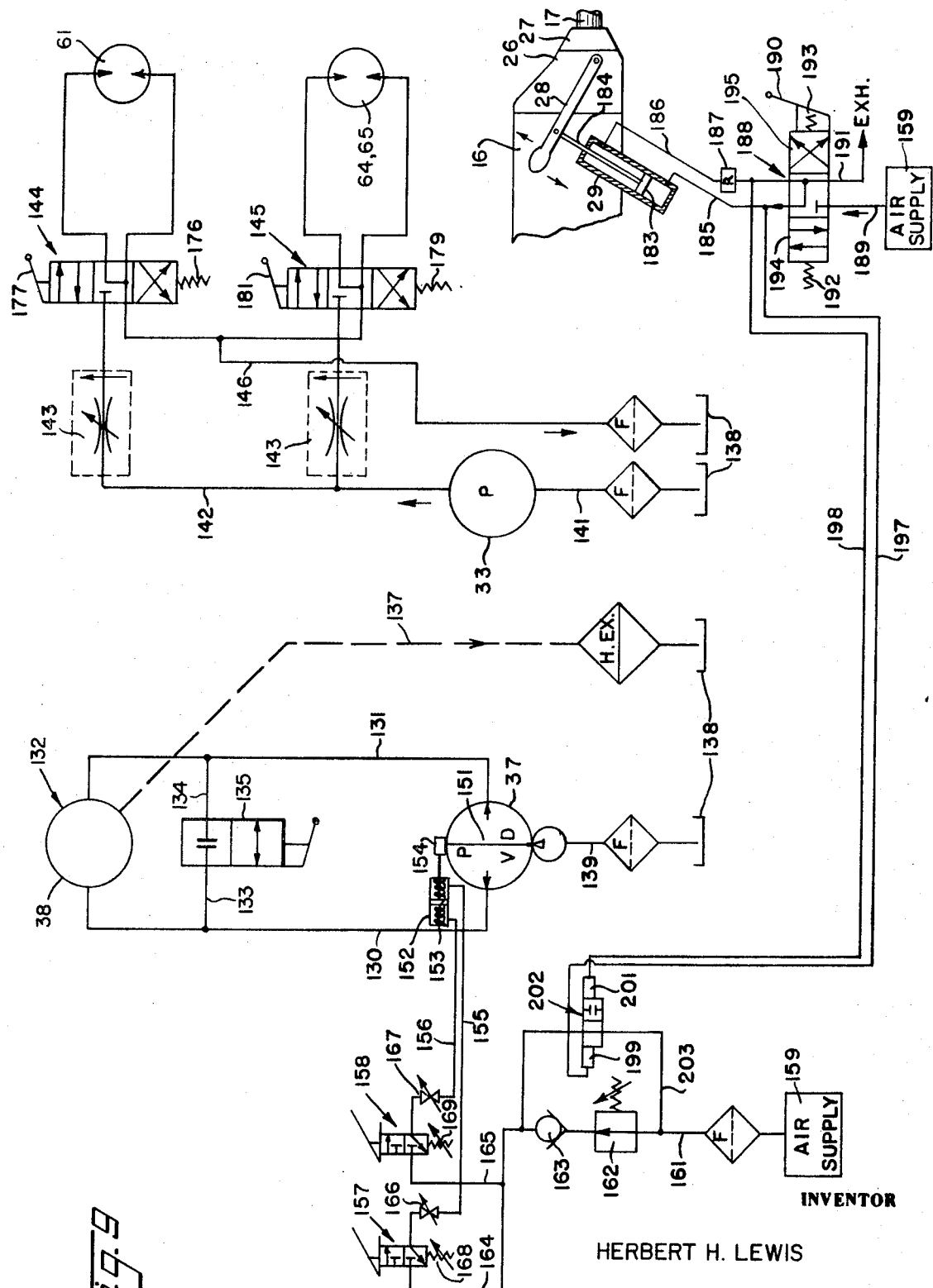
FIG. 9 is a mainly schematic view showing the pneumatic and hydraulic control arrangements.

Another pulley on shaft 17 is connected by a drive belt 31 to a pulley on a transverse shaft 32 suitably rotatably supported on the chassis and connected at one end to a hydraulic impeller pump 33, shown in circuit in FIG. 9, and at its other end to a fan drive pump 34 connected by conduits 35 to a hydraulic fan motor 36.

At its other side motor unit 16 is connected to drive a hyraulic main pump 37 which as will be described in more detail is connected by suitable conduits to drive one or more hydraulic motors 38 (FIG. 1) suitably supported beneath the chassis and connected by chain drive 39 to the rear wheels. As will appear, suitable controls are provided whereby the hydraulic circuit between the main pump 37 and motor or motors 38 is selectively controlled to drive the wheels 14 to move the machine along the tracks at two operational speeds, one a normal travel speed for moving the vehicle along the tracks between points at a steady relatively fast speed, about 25 miles per hour, and the other a slow or creeper speed at about 1-10 miles per hour while the machine is picking up ties from the roadside and destroying them. The hydraulic circuit, which is diagrammatically shown in FIG. 9 is controlled from suitable devices in the elevated cab structure 41 where the machine operator is seated.

Forwardly of the cab, a crane 42 is based on a turntable 43 and comprises a longitudinally extensible telescopic arm 44 terminating in a pickup jaw section 45. Turntable 43 is laterally centered on the chassis, and the crane may swing equally to either side of the tracks.

The chassis has a rigid front section 46 extending mainly beneath the crane and provided at its forward end with an upwardly open cradle 47 at the bottom of which is the rearwardly moving top flight 48 of an endless intake chain conveyor 49. As will appear conveyor 49 delivers the ties to be destroyed endwise into the destroying mechanism 25 shown in FIG. 3.

The shredded fragmented material from the destroying mechanism enters the open end 51 of a conveyor tube 52. Tube 52 leads into the intake of a fan assembly 53 at the outlet of which is a vertically upwardly extending discharge conduit 54 terminating in a distributor nozzle 55. The upper section of conduit 54 has a rotatable joint at 56 for directing nozzle 55 to discharge the fragments over a wide angle. A hydraulic motor (not shown) selectively operates a chain drive 57 at joint 56 to select the discharge direction of nozzle 55.

The rotor of fan assembly 53 is driven from the hydraulic motor 36.

The nozzle 55 pivots up and down to discharge shredded fragmented material aay from or close to the tracks or to deflect material into hopper trucks or cars located behind or to either side of the machine. The nozzle 55 is selectively operated by a hydraulic cylinder 204.

Figure 3:
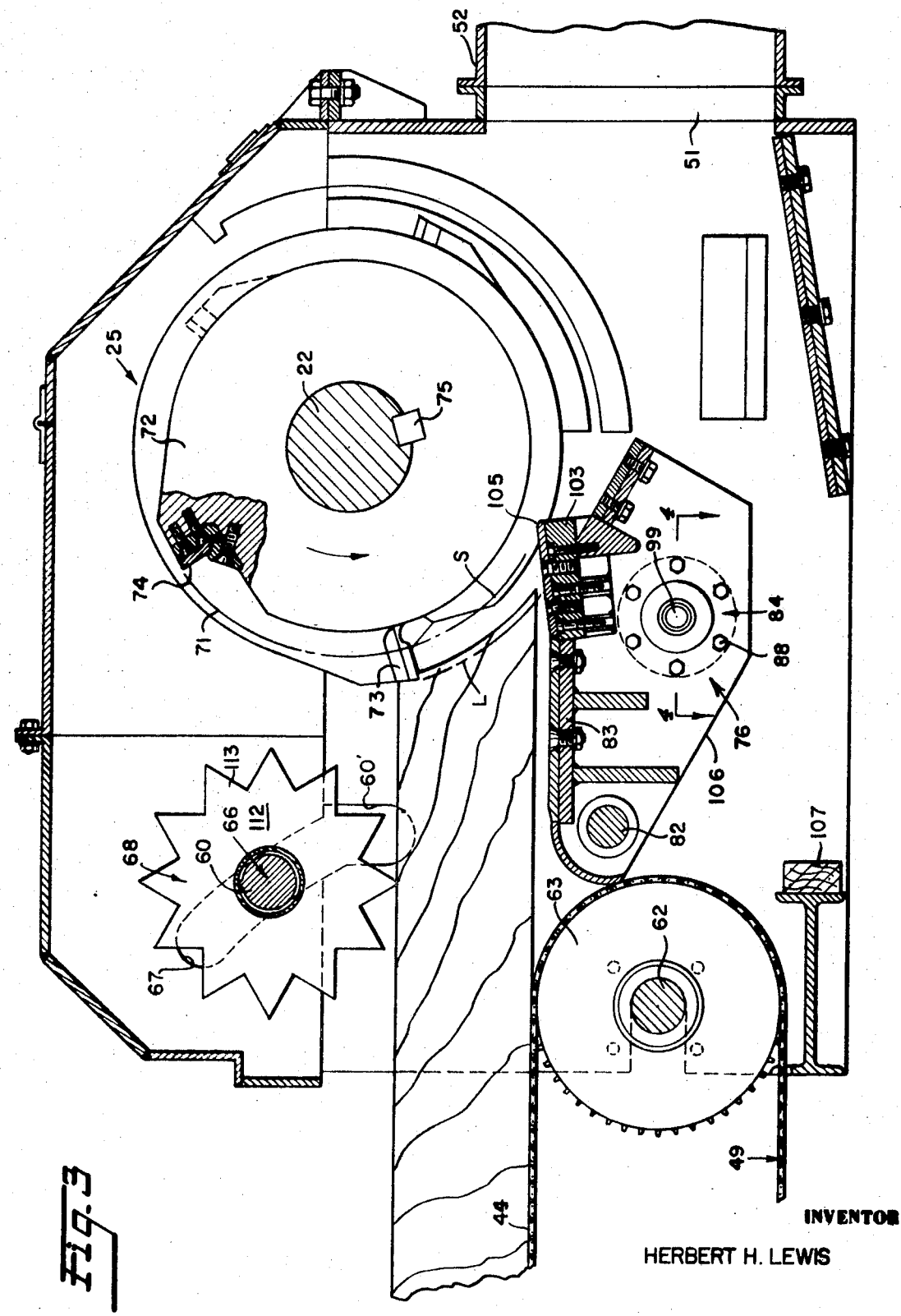
FIG. 3 is an enlarged fragmentary view mainly in section showing detail of the article advancing and shredding mechanism.

Referring now to FIGS. 2 and 3, a hydraulic motor 61 drives a shaft 62 suitably journalled on a fixed axis on the chassis and mounting a sprocket 63 over which passes the rear end of chain conveyor 49.

A pair of hydraulic motors 64 and 65 are mounted on opposite ends of a rotatable transverse vertically floating feed roll shaft 66. By driving feed roll 68 at a controlled speed, the feed of the article being reduced is closely controlled to prevent jamming of the cutting and punching mechanism. The opposite reduced diameter ends 60 of shaft 66 are disposed in parallel opposed arcuate guide slots 67 (one shown in FIG. 3) to permit automatic raising and lowering of the feed roll 68 thereon during operation. When there is no tie being fed into the destroying mechanism the shaft ends will descend to the stockets 60' at the lower ends of the slots to support the feed roll above the level of the anvil. Flexible hydraulic conduits connected to motors 64 and 65 permit this floating operation. The vertical float of the feed roll adapts it automatically to articles of different vertical dimension being advanced on the conveyor. The vertical float of the feed roll may also be controlled by air cylinders (not shown) to lift the weight of the feed roll.

Feed roll 68 may be of particularly novel structure as will appear in connection with FIG. 6.

Figure 8:
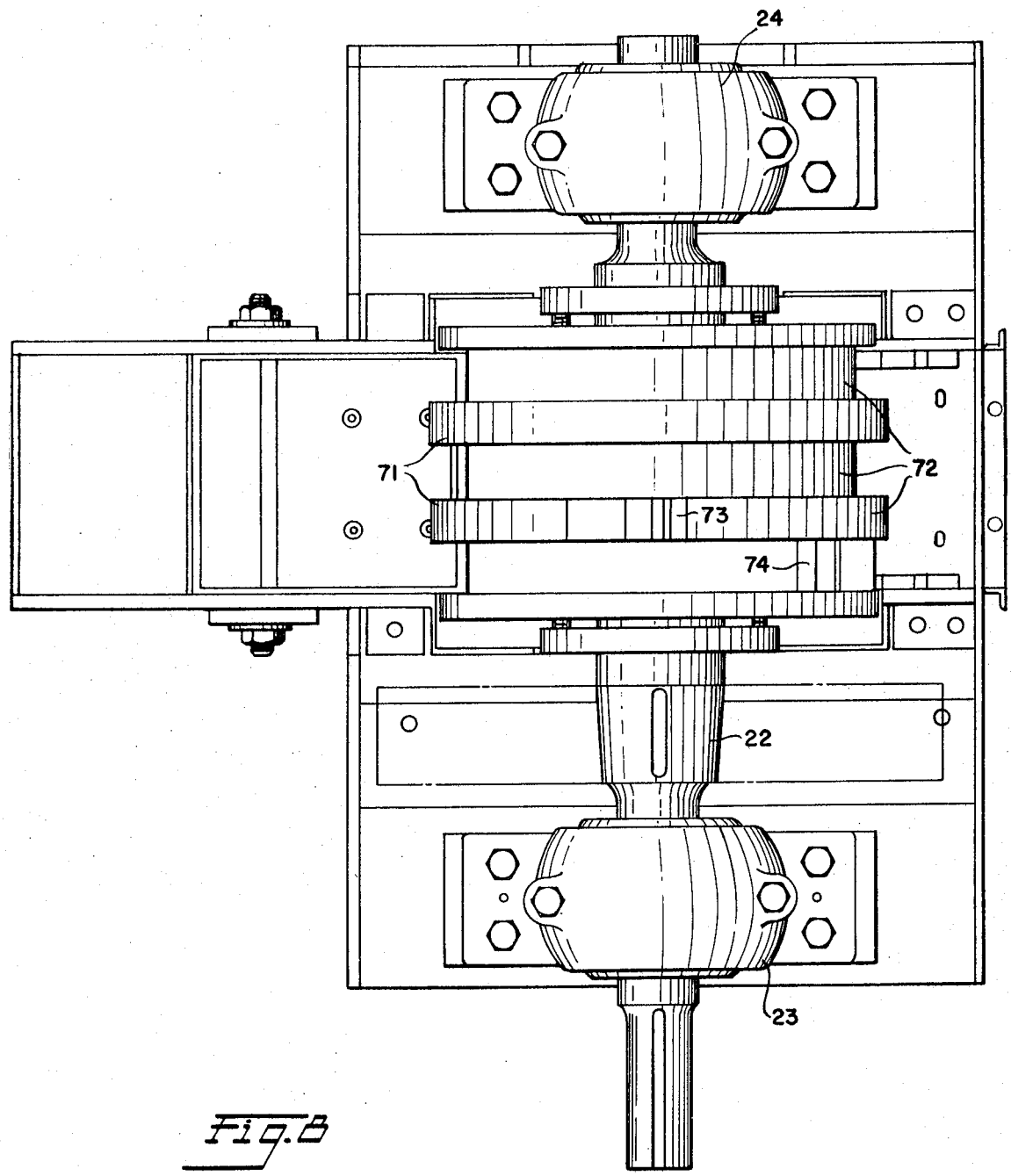
FIG. 8 is a plan view showing the cutting and punching means.

Referring to FIGS. 3 and 8, the shaft 22 has fixed thereon a cutting and punching rotor consisting of large diameter rings 71 and small diameter rings 72 arranged in alternate side by side relation. In the illustrated embodiment, there are two large diameter rings 71 each having a cutting tooth 73 interposed between three small diameter rings 72 each having a cutting tooth 74. Each ring is a separate element fixed to rotate with shaft 22, as by key 75.

Adjacent the cutting and punching rotor is mounted an anvil assembly 76 comprising (FIG. 3 and 7) side plates 77 and 78 provided with aligned apertures containing bushings 79 and 81 whereby the anvil assembly is pivotally mounted on opposed fixed stub shafts 82, only one of which is indicated in FIG. 7. The side plates are rigidly connected by a transverse structure 83 (FIG. 3) to form an anvil holder that is prevented from rocking downwardly about the pivots 82 by the shear pin structure indicated at 84 in FIG. 3 and shown in detail in FIG. 4.

Figure 4:
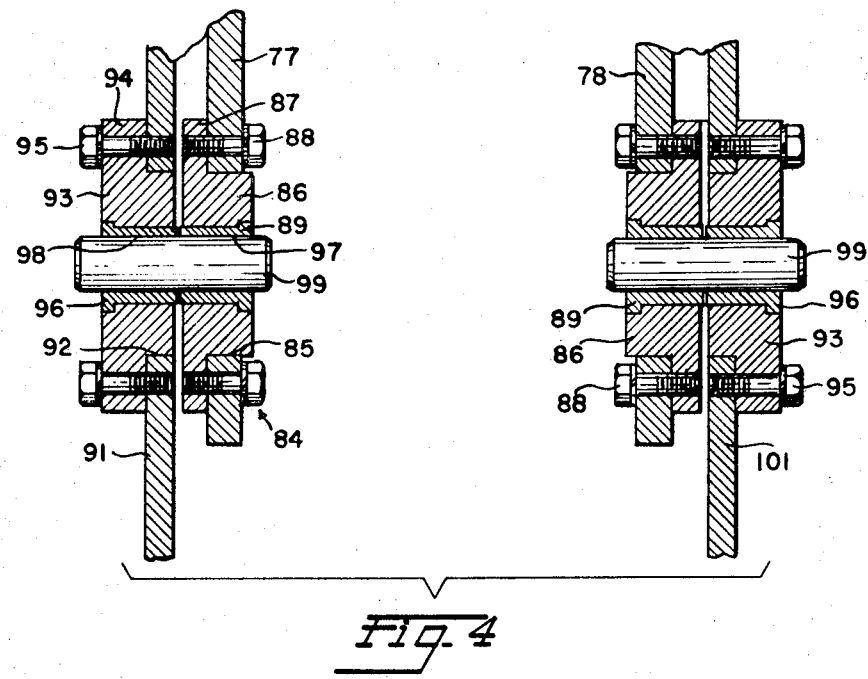
FIG. 4 is an enlarged fragmentary view in section showing an improved structure in the shear pin area.

Referring to FIG. 4, anvil side plate 77 is apertured at 85 for receiving a metal sleeve 86 having an enlarged flange 87 secured to plate 77 as by a series of bolts 88. Sleeve 86 has a central bore in which is pressed a hardened steel or like metal bushing 89. Similarly fixed chassis wall 91 adjacent the anvil is apertured at 92 to receive a sleeve 93 having an enlarged flange 94 secured to wall 91 as by a series of bolts 95. Sleeve 39 has a central bore within which is pressed a hardened steel or like metal bushing 96.

Preferably bushings 89 and 96 are exactly alike, so as to be interchangeable, and in any event they have internal bores 97 and 98 respectively of the same size in axial alignment to receive a cylindrical shear pin 99 extending between them. At the other side another shear pin 99 extends between plate 78 of the anvil support and the fixed chassis wall 101.

Pins 99 are preferably of bronze or some suitable metal that will shear when subjected to a predetermined load.

Referring to FIG. 7, the upper end of the anvil structure mounts relatively fixed long and short breaker elements 102 and 103 respectively, there being three long elements 102 for cooperating with smaller toothed rings 72 and two short elements 103 disposed between the long elements to cooperate with the larger toothed rings 71.

In operation, as the rotor turns in the direction of the arrow in FIG. 3, the teeth on the two larger rings 71 move on the circle indicated at L in FIG. 3 to pass through the spaces between long anvil elements into association with cooperation short anvil points 104, and the teeth on the three smaller rings 72 move on the circle indicated at S in FIG. 3 to pass in association with the long anvil elements points 105.

This association of toothed large and small rotor rings and long and short anvil elements is preferably essentially the same as disclosed in U.S. Pat. No. 2,869,793 to Montgomery issued Jan. 20, 1959 to which reference is made for further detail.

The present structure however is an improvement in that, should a large piece of iron or the like become trapped between the rotor and anvil teeth, the shear pins will shear before there is any damage to either the rotor teeth or the fixed breaker elements of the anvil. When the pins 99 shear, the entire anvil assembly 76 will swing downwardly by its weight clockwise about the fixed pivots at 82, until the side plate edges 106 abut the vertical buffer stop 107 in FIG. 3. As the anvil drops the trapped chunk of iron causing the problem will usually drop free onto the ground below the vehicle.

The disclosed shear pin mounting structure has particular merit in that it provides for speedy efficient removal and replacement of damaged shear pins. Very often the shear pins 99 become progressively bent or have one end displaced in a stepped region relative to the other, which makes it impossible to replace a pin that is so weakened if the pins merely extend through two aligned bores in metal frame members. In the structure of the invention, should for example shear pin 99 become bent or misaligned at the inner end passing through plate 77, the operator need only remove sleeve 93 and its bushing 96 endwise from the outer end of the pin and then drive pin 99 in the other direction out of bushing 89. If necessary a new bushing may be provided in sleeve 86 which is then ready to receive a fresh pin 99.

The foregoing reduces the down time of the machine as compared to that required to extract and replace damaged or broken shear pins disposed between the rotor rings and shaft as disclosed in said Montgomery patent. Besides being more accessible, providing the shear pins at the anvil eliminates the need to anqularly relocate the teeth on the large and small rings which is necessary during reassembly when the shear pins are located as in the patent.

Figure 5:
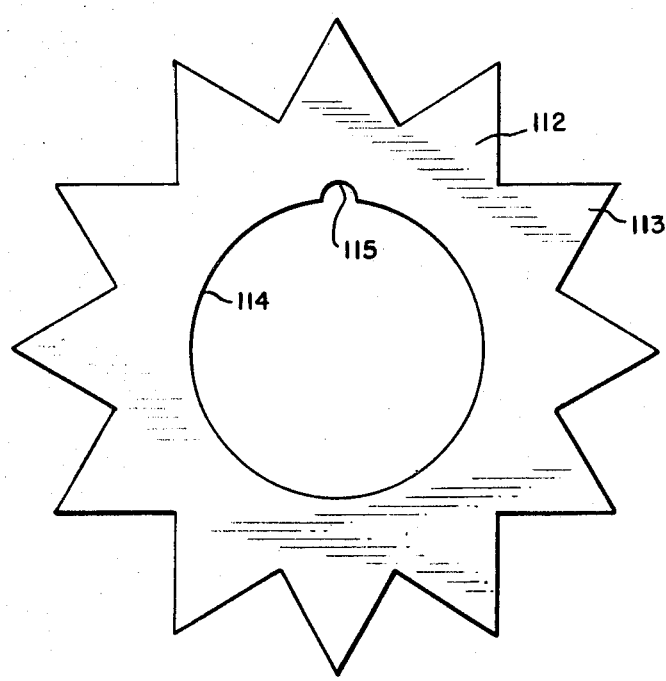
FIG. 5 is an elevational view of an element of the feed roll assembly.

Referring to FIGS. 5 and 6, the feed roller shaft 66 has an enlarged cylindrical portion 111 at its central portion, and a plurality of identical toothed discs 112 are non-rotatably mounted on portion 111. Each disc 112 may have the configuration shown in FIG. 5, wherein its periphery is a series of sharp pointed teeth 113. Each disc 112 has a cylindrical bore 114 to fit with a longitudinal fixed key 116 on the shaft. The discs 112 are equidistantly spaced along the shaft by similar spacer collars 117 disposed between adjacent discs, and at opposite ends annular retainer rings 118 and 119 engage the end discs and are secured on the shaft as by screws 121 and 122 to prevent axial displacement of the toothed discs. Should any disc 112 be damaged it can be readily repaired by removing a retainer ring for access without otherwise disturbing the assembly.

Referring to the control system shown in FIG. 9, the main hydraulic drive pump 37 is a reversible pump connected by conduits 130 and 131 to a main propulsion motor and gearbox assembly 132. The assembly 132 supplies power for the hydraulic motors 38 (FIG. 1). The conduits 130 and 131 connecting the main hydraulic drive pump 37 and propulsion motor and gearbox assembly 132 are further connected by conduits 133 and 134 through a valve 135. The valve 135 is normally closed to block off the flow of hydraulic fluid through the conduits 133 and 134 but in the event of an emergency and the machine has to be towed the valve 135 is opened to allow passage of fluid through conduits 133 and 134 by-passing the main hydraulic motor or motors 38. Motors 38 have a common return conduit 137 back to sump or reservoir 138 to which the inlet conduit 139 is pump 37 is also connected.

Impeller pump 33 has its inlet conduit 141 connected to sump 138. The outlet conduit 142 from pump 33 is connected through an adjustable restriction 143 to a valve assembly 144 for controlling drive of chain conveyor 49. Similarly the outlet conduit 142 from pump 33 is connected through an adjustable restriction 143 to a valve assembly 145 for controlling drive of feed roll 68. Valves 144 and 145 have a common return conduit 146 back to the sump.

The hydraulic circuit includes unidirectional pressure controlled safety bypasses or pressure relief valves (not shown) built into the main propulsion motor or motors 38.

Hydraulic main pump 37 is preferably of the variable displacement type wherein a rotatable angularly adjustable swash plate diagrammatically indicated at 151 in FIG. 9 is normally disposed in a neutral position where it does not reciprocate the oil pressure developing pistons (not shown) so that there would be hydraulic pressure in the circuit.

As shown in FIG. 9 a control cylinder 152 has a piston 153 connected at 154 at control the angularlity of swash plate 151. Return springs in cylinder 152 tend to center piston 153 to dispose swash plate 151 in the neutral position when no air pressure is supplied to the cylinder. Air conduits 155 and 156 enter the cylinder 152 at opposite sides of piston 153.

The operator's cab 41 contains two control pedal actuated valves 157 and 158. An air supply source 159 is connected by conduit 161 containing a pressure regulator 162 which reduces the air supply pressure and a unidirectional check valve 163 to inlet conduits 164 and 165 for the respective pedal control valves.

Valve 157, which controls drive of the vehicle in a forward direction, is interposed in conduit 164 which is connected through an adjustable restriction valve 166 to regulate speed of air through inlet conduit 155 to control cylinder 152. Similarly valve 158, which controls drive of the vehicle in reverse direction, is interposed in conduit 165 which is connected through an adjustable restriction valve 167 to regulate speed of air through inlet circuit 156 to control cylinder 152. Valve 157 is normally held closed by spring 168 and valve 158 is normally held closed by spring 169, as shown in FIG. 9.

Thus when pedal valve 157 is opened by the operator stepping on the pedal, piston 153 is displaced to the left to change the angularity of swash plate 151 and produce hydraulic pressure in conduit 130 for energizing motors 38 to drive the vehicle forward. An increase in angularity of the swash plates produces a greater volume of oil pumped into line 130 toward motors 38 and hence a greater speed for the vehicle.

When pedal valve 157 is opened by the operator stepping on the pedal, piston 153 is displaced to the left to change the angularity of swash plate 151 and produce hydraulic pressure in conduit 130 for energizing motors 38 to drive the vehicle forward. An increase in angularity of the swash plates produces a greater volume of oil pumped into line 130 toward motors 38 and hence a greater speed for the vehicle.

When pedal valve 158 is opened by the operator stepping on the pedal, piston 153 is displaced in the opposite direction to change the angularity of the swash plate in the opposite direction and thereby produce hydraulic pressure in conduit 131 to drive the motors 38 for reverse drive of the vehicle.

The adjustable valves 166 and 167 control the air pressure supplied to cylinder 152 and hence control the speed of the movement of piston 153 against the return springs and this controls the speed of changing the angularity of the swash plate and therefore provides a gradual speed up or down of motors 38 when a pedal valve is opened to keep from jerking the machine in starting and stopping. When a pedal valve 157 or 158 is released by the operator it is spring closed and no drive torque is transmitted to the vehicle wheels.

Valve 144 in the hydraulic circuit is normally biased to the shut off position of FIG. 9 by spring 176, and may be displaced in either direction by handle 177 to reversely drive motor 61 which rotates shaft 62 of the conveyor sprocket 63. Normally this drive is in the direction to advance a tie into the cutting mechanism but a reverse drive is provided for unblocking or like conditions.

Valve 145 in the hydraulic circuit is normally biased to the shut off position of FIG. 9 by spring 179, and may be displaced in either direction by handle 181 to reversely drive motors 64, 65 which rotate shaft 66 of the feed roll 68. Normally this drive is in the direction to feed a tie toward the cutting mechanism, bur reverse is provided to take care of jammed conditions.

Referring now to the lower right corner of FIG. 9, there is diagramatically shown the clutch 26 and actuating lever 28 above described and shown in FIG. 2.

Clutch control cylinder 29 contains a piston 183 having a rod 184 pivoted to lever 28. Air conduits 185 and 186 are connected into the cylinder at opposite sides of piston 183. An air flow regulator 187 is provided in conduit 186.

A valve assembly 188 is connected to a conduit 189 leading from air pressure source 159 and to a conduit 191 leading to an exhaust. Opposed springs 192 and 193 normally center valve 188 in the shut off position shown in FIG. 9. Handle 190 may be actuated to shift valve 188 either to the position where valve section 194 connected cylinder 29 to the air supply and exhaust to displace piston 183 to rock lever 28 clockwise in clutch disengaging direction, or where valve section 195 connects cylinder 29 to the air supply and exhaust to oppositely displace piston 183 to rock lever 28 counterclockwise to engage the clutch 26 to transmit drive torque to the fragmentation mechanism at 25.

Conduits 185 and 186 are connected by conduits 197 and 198 to actuators 199 and 201 respectively at opposite ends of a shiftable vehicle drive speed setting valve unit 202 disposed in a bypass conduit 203 prallel to air supply conduit 161.

When clutch control valve 188 is in the shut off position of FIG. 9, speed set valve 202 is positioned as shown in FIG. 9 to be in the neutral position and allow no air to be transmitted to the clutch control cylinder 29 allowing the clutch handle 28 to be manually operated without undue force. At the same time when clutch control valve 188 is in the shutoff off position of FIG. 9, speed set valve 202 will allow full supply air pressure to be transmitted through the pedal valves 157 and 158 to the cylinder 152 to move the swash plate 151 to the full volume position, either to the forward or reverse condition, to provide full travel speed of the machine.

When clutch control valve 188 has been shifted to introduce section 195 and rock lever 28 counterclockwise to cause clutch 26 to engage, air supply conduit 189 is connected to conduit 198 and thereby to actuator 201 to shift valve 202 to block the bypass conduit 203, so that only air pressure reduced by regulator 162 is transmitted to the pedal valves 157 and 158. Thus, the vehicle may be driven only in the creeper speed range when the cutting and punching mechanism is being driven.

When clutch control valve 188 has been shifted to introduce section 194, this causes the air pressure to rock lever 28 clockwise to disengage the clutch and at the same time air pressure is transmitted to actuator 199 to shift valve 202 to open bypass 203 and permit full supply pressure to be transmitted to the pedal valves. The vehicle now may be driven in the higher speed range.

It will be noted that valve 188 must be held in either position at opposite sides of neutral by the operator through handle 190, and when the operator releases handle 190 valve 202 will automatically move to the open position, the clutch will be disengaged and the bypass 203 will be open.

It is an important part of the invention that whenever the clutch 26 in the drive to the cutting and punching mechanism is engaged, the bypass 203 is automatically blocked so that the vehicle can be driven only in the low (1-10 MPH) range. Thus more power from motor unit 16 is available for the cutting and punching mechanism when it is running, and less power is used for driving the vehicle.

When the clutch 26 is disengaged, valve 202 automatically opens bypass 203 and more power is available to the vehicle drive for travel along the track at the higher speed range. At this time the cutting and punching mechanism is not and cannot be operated.

During operation the machine is driven at the higher speed to the region where the ties to be destroyed are located. During this period, the cutting and punching mechanism is automatically maintained disabled, and the implement drives are in neutral.

Upon reaching the desired region, the operator moves handle 190 to engage clutch 26 to start driving mechanism 25, and this automatically shifts the vehicle drive to the creeper speed range. At this time pumps 33 and 34 start supplying hydraulic fluid under pressure to the implement and fan circuits respectively. The crane is operated to pick up ties and deposit them in cradle 47, and valves 144 and 145 are operated to feed the ties into the mechanism 25 where they are cut into fragments. The fragments leaving mechanism 25 are drawn through conduit 52 and discharged through the fan outlet.

I claim:

1. Mobile apparatus for reducing wood and like articles to relatively small fragments comprising a vehicle having a chassis supported on wheels at least one set of which are drive wheels, a prime mover assembly on said chassis, variable speed drive means for connecting said prime mover assembly to said drive wheels, a cutting and punching mechanism on said chassis comprising a toothed rotor rotatable about an axis transversely of the chassis, a drive system between said prime mover assembly and said mechanism, conveyor means at the forward part of said apparatus for advancing articles to be reduced longitudinally of said chassis into said mechanism, means on said chassis for picking up articles to be reduced and depositing them on said conveyor means, and means at the rear of said apparatus providing a pressurized air system for discharging the fragments from said mechanism.

2. In the mobile apparatus defined in claim 1, said variable speed drive means including a low speed range setting and a higher speed range setting, said drive system to the cutting and punching mechanism including a clutch, and means permitting drive of the vehicle in the higher speed range only when said clutch is disengaged.

3. In the mobile apparatus defined in claim 2, an implement actuating hydraulic system having pump means driven through said clutch so as to be inoperable when said apparatus is driven in said higher speed range.

4. In the mobile apparatus defined in claim 1, said means for picking up articles comprising a forwardly disposed crane swivelly mounted on said chassis.

5. In the mobile apparatus defined in claim 1, said fragment discharge means comprising a blower having an intake connected by conduit means to said mechanism and an exhaust conduit projecting upwardly from the chassis.

6. In the apparatus defined in claim 1, at least one reversible hydraulic motor for said drive wheels, a reversible main hydraulic pump connected to be driven by said prime mover and having a hydraulic line connection to said motor, and operator controlled valve means in said line.

7. In the apparatus defined in claim 1, said conveyor being an endless chain having a generally horizontal upper flight on which said articles are deposited, and a floatingly mounted transverse feed roll above said flight adjacent said mechanism for controlling feed of articles into said mechanism.

8. Mobile apparatus for reducing articles of wood or the like to very small fragments comprising a vehicle having a set of drive wheels, and associated toothed rotor and fixed anvil mechanism, a conveyor for advancing articles along a generally horizontal path on said vehicle toward said mechanism, a prime mover on said vehicle, reversible hydraulic pump means on said vehicle driven by said prime mover and connected to a hydraulic drive motor at said wheels, mechanical drive means including a clutch between said prime mover and said mechanism, means including a first air cylinder connected to control said pump means, means including a second air cylinder connected to operate said clutch, valved compressed air supply circuits connected to said cylinders, and an interlock between said circuits for automatically varying the control of said pump means when said second air cylinder is operated to engage said clutch.

9. The mobile apparatus defined in claim 8, wherein the circuit to said first air cylinder comprises manually operable valve means for actuating said pump means to supply fluid under pressure in opposite directions in the hydraulic circuit to said wheel motor.

10. The mobile apparatus defined in claim 8, wherein the air circuit to said first air cylinder comprises parallel circuit branches, one of which is substantially unobstructed permitting a predetermined high air pressure to be transmitted to said first air cylinder for conditioning said pump means for high speed drive of the vehicle wheels and the other of which contains a pressure reducing device permitting only reduced air pressure to be transmitted to said first air cylinder for conditioning said pump means for slow speed drive of the vehicle wheels, and said interlock includes a normally open valve responsive to actuation of the second cylinder to engage the clutch for blocking said direct branch.

* * * * *

UNITED STATES PATENT OFFICE
CERTIFICATE OF CORRECTION

Patent No. 3,752,409  Dated  August 14, 1973

Inventor(s)  Herbert H. Lewis

It is certified that error appears in the above-identified patent and that said Letters Patent are hereby corrected as shown below:

Column 1, line 3, change "ou" to ---out---.

Column 1, line 13, change "alongisde" to ---alongside---.

Column 2, line 15, change "Th" to ---The---.

Column 3, line 4, change "aay" to ---away---.

Column 4, line 18, change "cooperation" to ---cooperating---.

Column 5, line 29, after "139" change "is" to ---of---.

Column 5, line 48, after "be" insert ---no---.

Column 6, line 53, change "bur" to ---but---.

Column 7, line 12, change "prallel" to ---parallel---.

The name of the Assignee should have been as follows:

"MONTGOMERY INDUSTRIES INTERNATIONAL, INC.
Jacksonville, Florida"

Signed and sealed this 1st day of January 1974.

(SEAL)
Attest:

EDWARD M. FLETCHER, JR.
Attesting Officer

RENE D. TEGTMEYER
Acting Commissioner of Patents